3,391,143
9-PIPERIDYL AND 9-PIPERIDYLIDENE
DERIVATIVES OF ACRIDAN
Carl Kaiser, Haddon Heights, N.J., and Charles L.
Zirkle, Berwyn, Pa., assignors to Smith Kline &
French Laboratories, Philadelphia, Pa., a corporation of Pennsylvania
No Drawing. Filed May 16, 1966, Ser. No. 550,177
10 Claims. (Cl. 260—279)

ABSTRACT OF THE DISCLOSURE 9-piperidyl and 9-piperidylidene derivatives of acridan with substituents on the acridan and piperidine ring nitrogens and the acridan nucleus have tranquilizing activity. The compounds are generally prepared by reaction of a piperidyl magnesium halide with an acridone or acridine.

This invention relates to novel 9-piperidyl and 9-piperidylidene derivatives of acridan which have useful pharmacodynamic activity, such as tranquilizing, activity. For example, the compounds of this invention demonstrate tranquilizing activity in the standard rat dose range procedure (described in David H. Tedeschi, et al., Arch. int. pharmacodyn., 1959, CXXII, No. 1–2, pages 129–143) after oral administration of from 10 to 100 mg./kg.

More specifically the compounds of this invention are represented by the following general structural formulas:

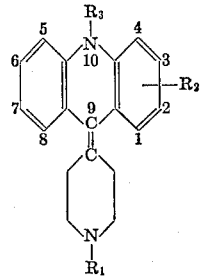    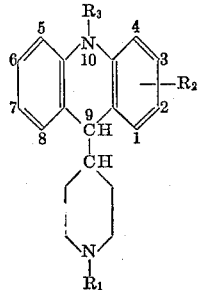

Formula I                Formula II wherein:

$R_1$ represents hydrogen, lower alkyl, lower acyl, hydroxyloweralkyl, lower acyloxy-lower alkyl, cycloalkylcarbonyl, cycloalkyl-lower alkyl, phenyl-lower alkyl, lower alkenyl or lower alkynyl;

$R_2$ represents hydrogen, chlorine, bromine, lower alkyl, lower alkoxy, lower alkylthio, trifluoromethyl, methylsulfinyl, trifluoromethylsulfonyl or dimethylsulfamyl; and $R_3$ represents lower alkyl, lower alkenyl, lower alkynyl, cycloalkyl-lower alkyl, phenyl or phenyl-lower alkyl, and in Formula II above, $R_3$ is also hydrogen.

Preferred compounds of this invention are represented by Formulas I and II when $R_1$ and $R_2$ are as defined above and $R_3$ represents lower alkyl, lower alkenyl or phenyl, and in Formula II also hydrogen.

Advantageous compounds of this invention are represented by Formulas I and II when:

$R_1$ represents lower alkyl, hydroxyloweralkyl or lower alkenyl;

$R_2$ represents hydrogen, chlorine, lower alkylthio or trifluoromethyl, preferably in position 2; and $R_3$ represents lower alkyl, lower alkenyl or phenyl, and in Formula II also hydrogen.

By the terms lower alkyl and lower alkoxy where used hereinabove or as part of a larger moiety, group having from 1 to 4 carbon atoms, preferably 1 to 2, are indicated. Cycloalkyl, lower alkenyl and lower alkynyl where used herein denote groups having 3 to 6 carbon atoms. Lower acyl where used herein denotes residues of organic hydrocarbon carboxylic acids having from 2 to 4 carbon atoms.

This invention also includes addition salts of the compounds of Formulas I and II hereabove formed with pharmaceutically acceptable acids. Such salts are easily prepared by methods known to the art. The base is reacted with either the calculated amount of organic or inorganic acid in aqueous miscible solvent, such as acetone or ethanol, with isolation of the salt by concentration and cooling or an excess of the acid in aqueous immiscible solvent, such as ethyl ether or chloroform, with the desired salt separating directly. Exemplary of such organic salts are those with maleic, fumaric, benzoic, ascorbic, pamoic, succinic, bismethylenesalicylic, methanesulfonic, ethanedisulfonic, acetic, propionic, tartaric, salicylic, citric, gluconic, lactic, malic, mandelic, cinnamic, citraconic, aspartic, stearic, palmitic, itaconic, glycolic, p-aminobenzoic, glutamic, benzene sulfonic and theophylline acetic acids as well as with the 8-halotheophyllines, for example, 8-bromotheophylline. Exemplary of such inorganic salts are those with hydrochloric, hydrobromic, sulfuric, sulfamic, phosphoric and nitric acids. Of course, these salts may also be prepared by the classical method of double decomposition of appropriate salts which is well-known to the art.

The 9-unsaturated compounds of Formula I are generally prepared as shown in the following synthetic scheme, illustrated by $R_1$ as $CH_3$:

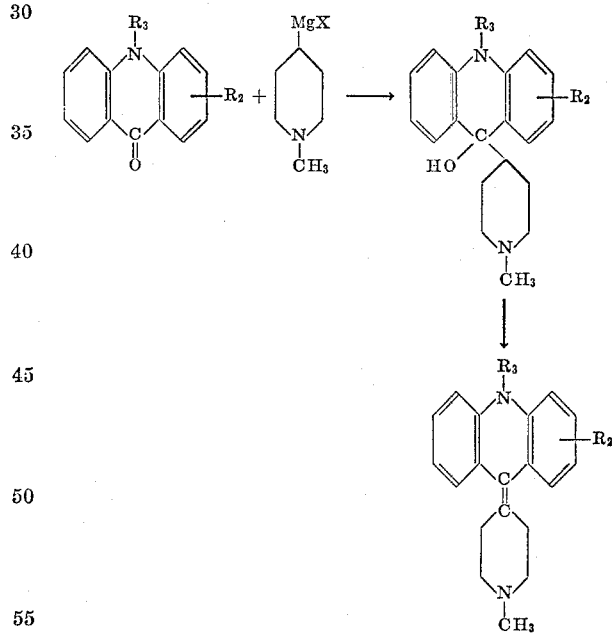

wherein $R_2$ and $R_3$ are as defined for Formula I and X is halogen, preferably chlorine or bromine. As outlined above the acridone starting material is reacted with a piperidyl magnesium halide in an inert organic solvent such as an ether, for example diethyl ether, dioxane or tetrahydrofuran. The reaction is carried out at from room temperature to the reflux temperature of the solvent, for from 30 minutes to 4 hours. The 9-hydroxy intermediate thus formed is distilled under reduced pressure to give the dehydrated 9-piperidylidene product.

The above described method may be similarly employed to prepare analogous compounds wherein $R_1$ is lower alkyl other than methyl, phenyl-lower alkyl, lower alkenyl or lower alkynyl by employing the appropriate N-substituted piperidyl magnesium halide.

To prepare the 9-unsaturated compounds of Formula I where $R_1$ is hydrogen, the 9-(1-methyl-4-piperidylidene)-acridan products prepared as described above are demethylated. This is accomplished by reaction with cyanogen bromide followed by acid hydrolysis of the resulting cyanamide which upon workup with dilute aqueous base gives the corresponding 9-hydroxy-9-(4-piperidyl)-acridan intermediates. The latter are dehydrated by distillation as described above to yield the products of Formula I where $R_1$ is hydrogen which by further alkylation affords a convenient route to the preparation of other $R_1$ substituted compounds. Thus, for example, condensation with ethylene oxide gives the β-hydroxyethyl derivative which may be further acylated with an acetyl halide to give the β-acetoxyethyl analogue; alkylation with an ethyl, n-propyl, allyl, propargyl, benzyl or phenethyl halide gives the corresponding alkylated derivatives; and reaction with an acetyl, propionyl, cyclobutane carbonyl or cyclopropane carbonyl halide gives the corresponding carbonyl derivatives which are reduced with a bimetallic hydride to the alkyl or cycloalkyl-alkyl analogues.

The 9-saturated compounds of Formula II when $R_1$ and/or $R_3$ are non-reducible groups and $R_3$ is also not hydrogen, are prepared from the corresponding 9-unsaturated compounds of Formula I by hydrogenation in the presence of a catalyst such as platinum oxide, palladium-on-charcoal or Raney nickel in a lower alkanol solvent such as ethanol or isopropanol. The 9-saturated compounds of Formula II when $R_1$ and/or $R_3$ are unsaturated aliphatic groups such as lower alkenyl or lower alkynyl are prepared by reduction of the corresponding 9-unsaturated compounds of Formula I with a bimetallic hydride as described above.

The 9-saturated compounds of Formula II when $R_1$ contains an acyl or carbonyl moiety and $R_3$ is not hydrogen are prepared advantageously by reaction of a 9-(4-piperidyl)-acridan product (wherein $R_1$ is hydrogen) with the appropriate acyl or carbonyl halide as described above.

The 9-saturated compounds of Formula II wherein $R_3$ is hydrogen are prepared as follows, illustrated by $R_1$ as $CH_3$:

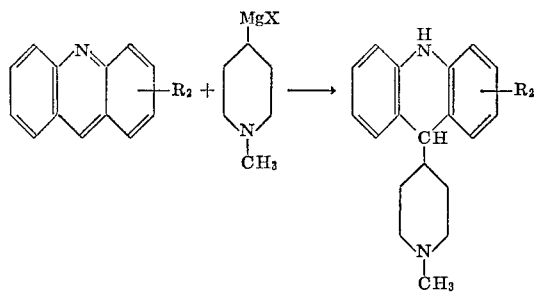

wherein $R_2$ is as defined above and X is halogen, preferably chlorine or bromine. According to this procedure 9-acridine is reacted with a piperidyl magnesium halide in an inert organic solvent such as, preferably, tetrahydrofuran at from room temperature to reflux temperature to give the indicated product. As set forth hereinabove other appropriately N-substituted piperidyl magnesium halides may be similarly employed. In addition the N-methylpiperidyl product may be demethylated and optionally further N-alkylated in the manner described for the N-methylpiperidylidene products.

The acridone and acridine starting materials are prepared by methods as described in U.S. Patent No. 3,131,190. The following examples are illustrative of the compounds of this invention and methods for their preparation and are not intended to limit the scope of the invention.

EXAMPLE I

To a stirred suspension of 3.9 g. of magnesium turnings in 125 ml. of tetrahydrofuran is added dropwise 22.6 g. of 4-chloro-1-methylpiperidine. After addition is complete the mixture is stirred and refluxed for one hour, then chilled in an ice-water bath and 19.0 g. of 10-methyl-2-trifluoromethyl-9-acridone is added in portions. The mixture is stirred and refluxed for three hours, then poured slowly into a solution of 30 g. of ammonium chloride in 500 ml. of water. This mixture is extracted with methylene chloride and the dried extract is concentrated to give 9 - hydroxy - 9-(1-methyl-4-piperidyl)-10-methyl-2-trifluoromethylacridan, M.P. 200–202° C.

The above 9-hydroxyacridan (7.5 g.) is distilled through a short column distillation apparatus to yield 9-(1-methyl-4 - piperidylidene) - 10-methyl-2-trifluoromethylacridan as the fraction distilling at 220–230° C. at 0.2 mm. An ethanolic solution of the free base is treated carefully with an ethereal solution of hydrogen chloride to pH 6. Colorless crystals of the hydrochloride salt are obtained, melting at 215–217° C. after recrystallization from n-butanol/ether.

Similarly reaction of an equivalent amount of 4-chloro-1-benzylpiperidine as described above gives the corresponding product, 9-(1-benzyl-4-piperidylidene)-10-methyl-2-trifluoromethylacridan.

EXAMPLE 2

A solution of 11.1 g. of 9-(1-methyl-4-piperidylidene)-10-methyl-2-trifluoromethylacridan (prepared as in Example 1) in 30 ml. of dry benzene is added dropwise to a stirred solution of 3.6 g. of cyanogen bromide in 15 ml. of benzene at room temperature. After the addition is complete the mixture is stirred for 90 minutes and allowed to stand overnight. Following addition of 75 ml. of absolute ether, the product, 9-(1-cyano-4-piperidylidene)-10-methyl-2-trifluoromethylacridan, is collected.

To a solution of 150 ml. of glacial acetic acid, 100 ml. of water and 15 ml. of concentrated hydrochloric acid is added 7.6 g. of the above cyano compound and the mixture is heated to reflux for 16 hours. The reaction mixture is concentrated and then treated with 100 ml. of 10% aqueous sodium hydroxide solution to give 9-hydroxy-9-(4-piperidyl)-10-methyl-2-trifluoromethylacridan.

The above 9-hydroxyacridan (2.5 g.) is distilled as described in Example 1 to yield 9-(4-piperidylidene)-10-methyl-2-trifluoromethylacridan.

EXAMPLE 3

A mixture of 15.8 g. of 2 - chloroacridine and the Grignard reagent prepared from 14.7 g. of 4-chloro-1-methylpiperidine and 2.7 g. of magnesium is tetrahydrofuran is reacted as described in Example 1 to yield upon workup, 9-(1-methyl-4-piperidyl)-2-chloroacridan, M.P. 184.5–186° C.

Similarly, replacing 13.2 g. of acridine in the above reaction sequence gives 9-(1-methyl-4-piperidyl)-acridan.

EXAMPLE 4

A mixture of 6.9 g. of 9-(4-piperidylidene)-10-methyl-2-trifluoromethylacridan (prepared as in Example 2), 3.4 g. of n-propyl iodide and 2.8 g. of potassium carbonate in 75 ml. of toluene is refluxed and stirred for 30 hours. The cooled reaction mixture is treated with 50 ml. of water and 200 ml. of hexane and the separated organic layer is washed with additional portions of water. The hexane solution is concentrated to yield 9-(1-propyl-4-piperidylidene)-10-methyl-2-trifluoromethylacridan.

EXAMPLE 5

To a suspension of 7.7 g. of 9-(4-piperidylidene)-10-methyl-2-trifluoromethylacridan (prepared as in Example 2) in 15 ml. of benzene is added 2.8 g. of allyl bromide in 5 ml. of benzene. The mixture is stirred at room temperature for 90 minutes, filtered and ether added to the filtrate. The filtrate is concentrated in vacuo to give 9-(1-allyl - 4 - piperidylidene) - 10 - methyl-2-trifluoromethylacridan.

Similarly reaction with an equivalent amount of propargyl chloride yields 9 - (1-propargyl-4-piperidylidene)-10-methyl-2-trifluoromethylacridan.

EXAMPLE 6

A slurry of 5.0 g. of 9-(4-piperidylidene)-10-methyl-2-trifluoromethylacridan (prepared as in Example 2) in 35 ml. of methanol is cooled in an ice-bath, stirred and 3 g. of ethylene oxide in 5 ml. of methanol is added. The reaction mixture is allowed to stand at room temperature overnight and then concentrated in vacuo to furnish the product, 9 - [1 - (β - hydroxyethyl)-4-piperidylidene]-10-methyl-2-trifluoromethylacridan.

EXAMPLE 7

To a solution of 3.3 g. of 9-[1-(β-hydroxyethyl)-4-piperidylidene]-10-methyl-2- trifluoromethylacridan (prepared as in Example 6) in 30 ml. of benzene is added a solution of 1.6 g. of acetyl chloride in 10 ml. of benzene and the mixture is refluxed for 30 minutes. The reaction mixture is concentrated in vacuo, the residue is taken up in ethanol and ether is added to give the hydrochloride salt of 9-[1-(β-acetoxyethyl)-4-piperidylidene]-10-methyl-2-trifluoromethylacridan.

EXAMPLE 8

A mixture of 3.4 g. of 9-(4-piperidylidene)10-methyl-2-trifluoromethylacridan (prepared as in Example 2) and 0.93 g. of propionyl chloride in 25 ml. of pyridine is warmed on the steam bath for one hour. The reaction mixture is poured into dilute sodium hydroxide solution and extracted with methylene chloride. The organic extract is washed with water, dried and evaporated in vacuo to give 9-(1-propionyl-4-piperidylidene)-10-methyl-2 - trifluoromethylacridan.

Similarly, reaction with 1.2 g. of cyclobutane carbonyl chloride or 1.1 g. of cyclopropane carbonyl chloride as described above yields 9-(1-cyclobutanecarbonyl-4-piperidylidene - 10 - methyl-2-trifluoromethylacridan and 9-(1-cyclopropanecarbonyl-4-piperidylidene)-10-methyl-2 - trifluoromethylacridan, respectively.

EXAMPLE 9

To a stirred suspension of 2.8 g. of lithium aluminum hydride in 50 ml. of ether is added 3.1 g. of 9-(1-cyclobutanecarbonyl - 4 - piperidylidene) - 10 - methyl - 2 - trifluoromethylacridan (prepared as in Example 8) in 50 ml. of ether and the mixture is stirred and refluxed for three and one-half hours. The reaction mixture is decomposed, filtered and the filtrate concentrated in vacuo to give 9-(1-cyclobutylmethyl - 4 - piperidylidene) - 10 - methyl - 2 - trifluoromethylacridan.

Similarly, reduction of 9 - (1-cyclopropanecarbonyl-4-piperidylidene) - 10 - methyl - 2 - trifluoromethylacridan (prepared as in Example 8) as described above yields a 9 - (1 - cyclopropylmethyl - 4 - piperidylidene) - 10-methyl-2-trifluoromethylacridan.

EXAMPLE 10

A mixture of 6.4 g. of 9-(1-methyl-4-piperidylidene)-10 - methyl-2-trifluoromethylacridan (prepared as in Example 1), 1.7 g. of 10% palladium-on-charcoal and 150 ml. of ethanol is hydrogenated for four hours. Filtration of the catalyst and removal of the solvent in vacuo leaves the product, 9 - (1 - methyl - 4-piperidyl)-10-methyl-2-trifluoromethylacridan.

Similarly hydrogenation of 6.2 g. of 9-(4-piperidylidene) - 10 - methyl - 2 - trifluoromethylacridan (prepared as in Example 2) as described above yields 9-(4-piperidyl)-10-methyl-2-trifluoromethylacridan.

EXAMPLE 11

Following the general procedure of Example 1, 14.6 g. of 10-methylacridone and the Grignard reagent prepared from 3.9 g. of magnesium and 22.6 g. of 1-methyl-4-chloropiperidine in 125 ml. of tetrahydrofuran are refluxed for three hours. Workup gives 9-hydroxy-9-(1-methyl-4-piperidyl)-10-methylacridan which on distilling gives 9-(1-methyl-4-piperidylidene)-10-methylacridan.

Hydrogenation of the above prepared piperidylidene compound in ethanol with 1.5 g. of 10% palladium-on-charcoal gives 9-(1-methyl-4-piperidyl)-10-methylacridan.

Similarly employing 15.6 g. of 10-ethylacridone or 17.6 g. of 10-butylacridone in the above reaction sequence there are obtained 9-(1-methyl-4-piperidylidene)-10-ethylacridan and 9-(1-methyl-4-piperidylidene)-10-butylacridan, respectively, which are hydrogenated to give 9-(1-methyl-4-piperidyl)-10-ethyl-acridan and 9-(1-methyl-4-piperidyl)-10-butylacridan, respectively.

EXAMPLE 12

Following the general procedure of Example 1, 15.6 g. of 1,10-dimethylacridone and the Grignard reagent prepared from 1-methyl-4-chloropiperidine in 150 ml. of tetrahydrofuran are refluxed for three hours and worked up to give 9-(1-methyl-4-piperidylidene)-1,10-dimethylacridan.

Similarly 16.7 g. of 2-methoxy-10-methylacridone is reacted as described above to give 9-(1-methyl-4-piperidylidene)-10-methyl-2-methoxyacridan.

EXAMPE 13

Following the general procedures of Examples 1 and 11 whereby an acridone is reacted with the Grignard reagent prepared from 1-methyl-4-chloropiperidine, dehydrated by distillation and hydrogenated with palladium-on-charcoal, the following acridones are similarly reacted to give the indicated products:

23.9 g. of 10-methyl-2-trifluoromethylsulfonyl-9-acridone gives 9-(1-methyl-4-piperidylidene)-10-methyl-2-trifluoromethylsulfonylacridan and the corresponding piperidyl compound;

17.9 g. of 10-methyl-2-methylthio-9-acridone gives 9-(1-methyl-4-piperidylidene) - 10-methyl-2-methylthioacridan and the corresponding piperidyl compound;

22.1 g. of 10-methyl-2-(N,N-dimethylsulfamoyl)-9-acridone gives 9-(1-methyl-4-piperidylidene)-10-methyl-2-(N,N-dimethylsulfamoyl)-acridan and the corresponding piperidyl compound; and 20.2 g. of 10-methyl-2-bromo-9-acridone gives 9-(1-methyl-4-piperidylidene)-10-methyl-2-bromoacridan and the corresponding piperidyl compound.

EXAMPLE 14

Following the general procedure of Example 1, 18.9 g. of 10-phenyl-9-acridone and the Grignard reagent prepared from 1-methyl-4-chloropiperidine in 150 ml. of tetrahydrofuran are refluxed for three hours and worked up to give 9-(1-methyl-4-piperidylidene)-10-phenylacridan.

Similarly 19.9 g. of 10-benzyl-9-acridone is reacted as described above to yield 9-(1-methyl-4-piperidylidene)-10-benzylacridan.

EXAMPLE 15

A mixture of 16.4 g. of 10-allyl-9-acridone and the Grignard reagent prepared from 1-methyl-4-chloropiperidine are reacted as described in Example 1 to yield after workup 9-(1-methyl-4-piperidylidene)-10-allylacridan.

Following the same procedure as above, 16.2 g. of 10-propargyl-9-acridone gives 9-(1-methyl-4-piperidylidene)-10-propargylacridan.

EXAMPLE 16

To a stirred suspension of 3.9 g. of magnesium turnings in 125 ml. of tetrahydrofuran is added dropwise 22.6 g. of 4-chloro-1-methylpiperidine. After addition is complete the mixture is stirred and refluxed for one hour, then chilled in an ice-water bath and 19.0 of 10-methyl-2-methylsulfinyl-9-acridone (prepared from 10-methyl-2-methylthio-9-acridone by oxidation with m-chloroperbenzoic acid) is added in portions. The mixture is stirred at room temperature for one hour, poured into aqueous ammonium chloride solution and extracted with methylene chloride. The dried extract is concentrated to give 9-hydroxy-9-(1-methyl-4-piperidyl) - 10-methyl-2-methylsulfinylacridan. The latter is distilled under reduced pressure to yield 9-(1-methyl-4-piperidylidene)-10-methyl-2-methylsulfinylacridan.

EXAMPLE 17

Five grams of 10-cyclopropylmethyl-2-trifluoromethyl-9-acridone is refluxed with an excess of the Grignard reagent formed from 4-chloro-1-methylpiperidine in tetrahydrofuran and worked up as described in Example 1 to give 9-hydroxy-9-(1-methyl-4-piperidyl)-10-cyclopropylmethyl-2-trifluoromethylacridan which is distilled to give 9-(1-methyl-4-piperidylidene) - 10 - cyclopropylmethyl-2-trifluoromethylacridan.

Hydrogenating this piperidylidene compound in ethanol with a palladium-on-charcoal catalyst yields 9-(1-methyl-4-piperidyl)-10-cyclopropylmethyl - 2-trifluoromethylacridan.

Similarly, employing in the above reaction sequence 10-cyclopentylethyl-2-trifluoromethyl-9-acridone or 10-cyclohexylethyl-2-trifluoromethyl-9-acridone there are obtained the corresponding 10-substituted acridan products.

EXAMPLE 18

To a solution of 3.44 g. of 9-(4-piperidylidene)-10-methyl-2-trifluoromethylacridan (prepared as in Example 2) in 25 ml. of pyridine is added dropwise 0.86 g. of acetyl chloride. The solution is heated at 100° C. for one hour, then it is cooled and diluted with water. The mixture is extracted with methylene chloride. The extracts are dried and evaporated in vacuo to give 9-(1-acetyl-4-piperidylidene)-10-methyl-2-trifluoromethylacridan. This amide is added slowly to a stirred suspension of 0.5 g. of lithium aluminum hydride in 50 ml. of ether. The mixture is stirred and refluxed for eight hours. The reaction mixture is decomposed by careful addition of aqueous sodium hydroxide solution, filtered and the filtrate concentrated in vacuo to give 9-(1-ethyl-4-piperidylidene)-10-methyl-2-trifluoromethylacridan.

What is claimed is.

1. Chemical compounds selected from the group consisting of free bases and salts thereof with pharmaceutically acceptable acids, said free bases having the formulas:

in which:

$R_1$ is hydrogen, lower alkyl, lower alkanoyl, hydroxyloweralkyl, lower alkanoyloxy-lower alkyl, cycloalkylcarbonyl, cycloalkyl-lower alkyl, phenyl-lower alkyl, lower alkenyl or lower alkynyl;

$R_2$ is hydrogen, chlorine, bromine, lower alkyl, lower alkoxy, lower alkylthio, trifluoromethyl, methylsulfinyl, trifluoromethylsulfonyl or dimethylsulfamyl; and $R_3$ is lower alkyl, lower alkenyl, lower alkynyl, cycloalkyl-lower alkyl, phenyl or phenyl-lower alkyl, and in Formula II, also hydrogen.

2. Chemical compounds in accordance with claim 1 in which $R_3$ is lower alkyl, lower alkenyl or phenyl, and in Formula II, also hydrogen.

3. Chemical compounds in accordance with claim 2 in which $R_1$ is lower alkyl, hydroxyloweralkyl or lower alkenyl.

4. Chemical compounds in accordance with claim 3 in which $R_2$ is hydrogen, chlorine, lower alkylthio or trifluoromethyl.

5. A chemical compound in accordance with claim 4 having Formula I in which $R_1$ and $R_3$ are methyl and $R_2$ is 2-chloro.

6. A chemical compound in accordance with claim 4 having Formula I in which $R_1$ and $R_3$ are methyl and $R_2$ is 2-trifluoromethyl.

7. A chemical compound in accordance with claim 4 having Formula II in which $R_1$ is methyl, $R_2$ is 2-chloro and $R_3$ is methyl or hydrogen.

8. A chemical compound in accordance with claim 4 having Formula II in which $R_1$ is methyl, $R_2$ is 2-trifluoromethyl and $R_3$ is methyl or hydrogen.

9. A chemical compound having the formula:

in which $R_1$ is lower alkyl and phenyl-lower alkyl; and $R_2$ and $R_3$ are as defined in claim 1.

10. A chemical compound in accordance with claim 9 in which $R_1$ and $R_3$ are methyl and $R_2$ is 2-trifluoromethyl.

References Cited

UNITED STATES PATENTS

| | | | |
|---|---|---|---|
| 3,014,911 | 12/1961 | Engelhardt | 260—293 |
| 3,153,652 | 10/1964 | Drukker et al. | 260—293 |

OTHER REFERENCES

Gordon: "Psychopharmacological Agents," Academic Press, vol. 1, 1964, pp. 36–41 and 70.

NICHOLAS S. RIZZO, *Primary Examiner.*

D. G. DAUS, *Assistant Examiner.*